United States Patent [19]
Tanaka

[11] Patent Number: 5,283,745
[45] Date of Patent: Feb. 1, 1994

[54] PRODUCTION EXECUTION METHOD

[75] Inventor: Nobuhiro Tanaka, Miyashiro, Japan

[73] Assignee: Kao Corporation, Tokyo, Japan

[21] Appl. No.: 622,560

[22] Filed: Dec. 5, 1990

[30] Foreign Application Priority Data

Dec. 5, 1989 [JP] Japan .................. 1-316227

[51] Int. Cl.⁵ .......................................... G06F 15/46
[52] U.S. Cl. ..................... 364/468; 364/478
[58] Field of Search ............ 364/478, 401, 403, 478, 364/479, 468

[56] References Cited

U.S. PATENT DOCUMENTS

| | | | |
|---|---|---|---|
| 4,459,663 | 7/1984 | Dye | 364/403 |
| 4,472,783 | 9/1984 | Johnstone et al. | 364/468 |
| 4,669,047 | 5/1987 | Chucta | 364/478 |
| 4,796,194 | 1/1989 | Atherton | 364/468 |
| 4,821,197 | 4/1989 | Kenik et al. | 364/468 |
| 5,093,794 | 3/1992 | Howie et al. | 364/468 |

FOREIGN PATENT DOCUMENTS 63-306861 12/1988 Japan .

Primary Examiner—Jerry Smith
Assistant Examiner—Steven R. Garland
Attorney, Agent, or Firm—Birch, Stewart, Kolasch & Birch

[57] ABSTRACT

A production execution method of the present invention includes the steps of storing in a storage facility at least one kind of material, among various kinds of material used to produce desired goods, calculating a producible quantity of goods based on an already procured quantity or already stocked quantity of the various kinds of material using a calculation processor, and deciding a quantity equal to or below the producible quantity as a production execution quantity. Thereafter, the production executing quantity is set by being divided into two or more smaller quantities wherein a required quantity of the material is then taken out from the storage facility for each set quantity for each setting so that production of the decided production execution quantity of goods can be executed in sequence.

7 Claims, 19 Drawing Sheets

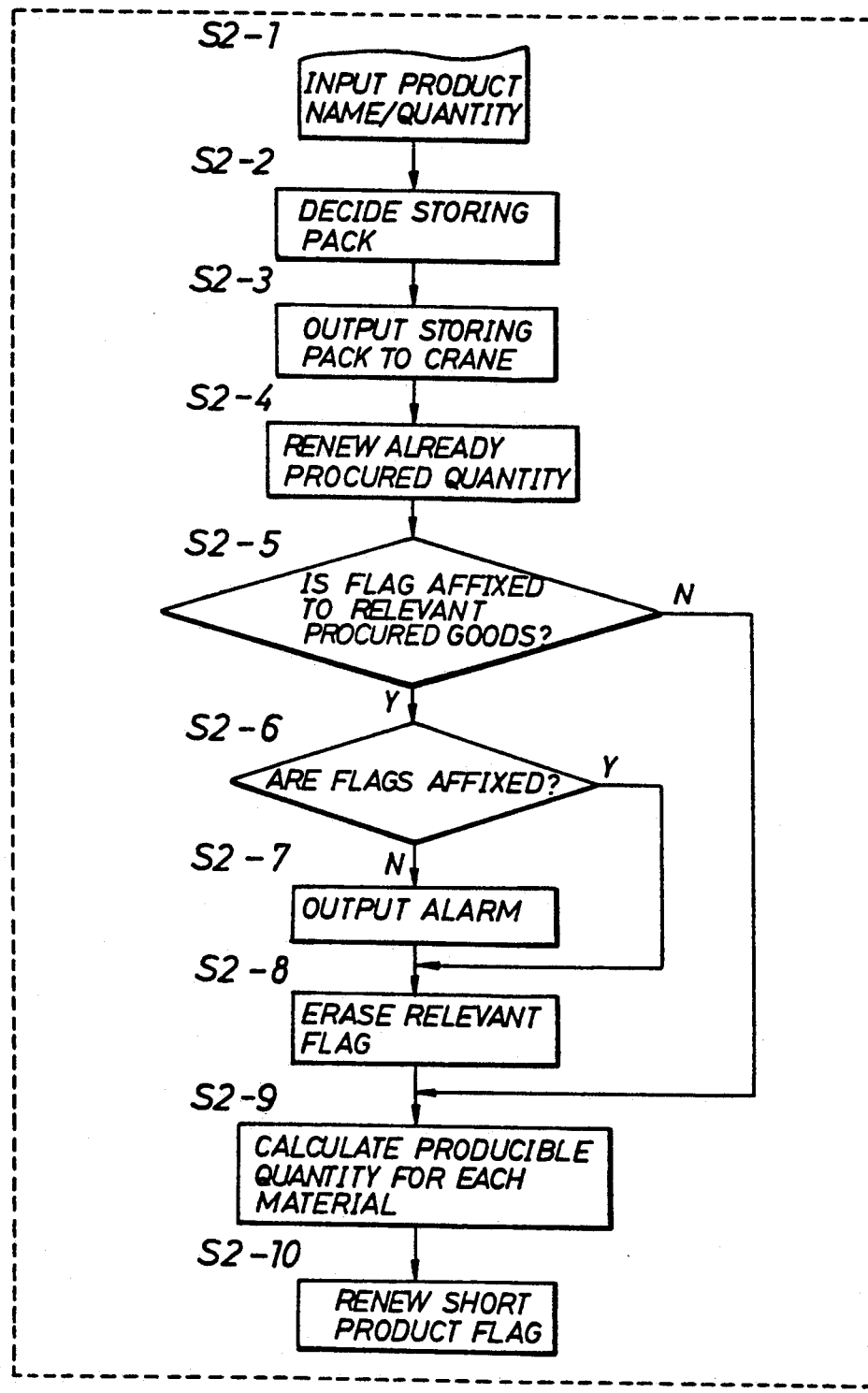

Fig .6b

SCREEN 6
KINDS OF PRODUCT MENU

SCREEN 61
INQUIRY SCHEDULED PRODUCTION QUANTITY

SCREEN 61
INQUIRY FOR PRODUCIBLE QUANTITY

SCREEN 62
INQUIRY FOR PRODUCTION PROGRESSING STATE

SCREEN 63
SET MATERIAL FOR OUTLET

SCREEN 64
SET PRODUCT FOR INLET

Fig. 7

SCREEN 5

1 : INLET SETTING
2 : OUTLET SETTING
3 : INQUIRY
4 : MAINTENANCE
☐ 5 : PREPARATION OF LIST
6 : END WORK/INTERRUPTION
7 : EXCEPTIONAL INLET/OUTLET SETTING
8 : DRIVING STATE DISPLAY
9 : KINDS OF PRODUCT MENU
10 : PRODUCTION SCHEDULE REGISTRATION

Fig. 8

SCREEN 51

KINDS OF PRODUCT MENU

| No. | NAME OF PRODUCT | CODE | SCHEDULED PRODUCTION QUANTITY | PRODUCTION PERIOD START ~ END |
|---|---|---|---|---|
| 1. | B 2500 | [0005] | 10,000 CS | 9/3 ~ 9/28 |
| 2. | B 2000 | [0001] | 3,000 CS | 9/10 ~ 9/21 |
| 3. | B 3000 | [0003] | 500 CS | 9/20 ~ 9/21 |
| 4. | | | CS | ~ |
| 5. | | | CS | ~ |
| 6. | | | CS | ~ |
| 7. | | | CS | ~ |
| 8. | | | CS | ~ |
| 9. | | | CS | ~ |
| 10. | | | CS | ~ |

PLEASE DEPRESS FUNCTION KEY

SCHEDULE REGISTRATION | POSSIBILITY INQUIRY | PROGRESS INQUIRY | | MAINTENANCE | | NEXT PAGE | | END

Fig. 9

SCHEDULED PRODUCTION INPUT

NAME OF PRODUCT CODE CS/PL  SCHEDULED PRODUCTION QUANTITY  PRODUCTION PERIOD START ~ END  SIMPLE ON DAY PRODUCTION QUANTITY

B 2500  [0005] <40>   [10,000 CS]   89/9/3~89/9/28   [526]

| No. | NAME OF MATERIAL | CODE | CS/PL | SCHEDULED MATERIAL PROCURED QUANTITY | USED QUANTITY | FILLED QUANTITY / PRODUCT CASE | MATERIAL CASE |
|---|---|---|---|---|---|---|---|
| 1. | A-1 1.8kg | [0505] | <50> | 2,000 CS | | 2 PC | 10 PC |
| 2. | A-2 1/3 | [0501] | <40> | 1,280 CS | | 3 PC | 24 PC |
| 3. | A 3 | [0800] | <30> | 600 CS | | 3 PC | 50 PC |
| 4. | A 4 | [1005] | <120> | 30,000 CS | | 3 PC | 1 PC |
| 5. | A 5 | [1105] | <500> | 10,000 CS | | 1 PC | 1 PC |
| 6. | | | | CS | | PC | PC |
| 7. | | | | CS | | PC | PC |
| 8. | | | | CS | | PC | PC |
| 9. | | | | CS | | PC | PC |
| 10. | | | | CS | | PC | PC |

> CONFIRMATION Y/N
PLEASE DEPRESS FUNCTION KEY

SCREEN 511

[CORRECT] [ERASE] [PRODUCT] [NEXT PAGE] [MENU]
INPUT

Fig. 10

SCREEN 53

MATERIAL INLET SETTING

| No. | NAME OF MATERIAL | CODE | CS | ODD NUMBER |
|-----|------------------|------|-----|------------|
| 01  | A-1  1.8 kg      | 0505 | 50  |            |
| 02  | A-1  1.8 kg      | 0505 | 50  |            |
| 03  | — —              | —    | —   |            |
| 04  | — —              | —    | —   |            |
| 05  | — —              | —    | —   |            |
| 06  | — —              | —    | —   |            |
| 07  | — —              | —    | —   |            |
| 08  | — —              | —    | —   |            |
| 09  | — —              | —    | —   |            |
| 10  | — —              | —    | —   |            |

>PRODUCT CODE: 0505  A-1  1.8 kg
>NUMBER OF CS: ( 50)
>CONFIRMATION: Y/N

END  CANCEL  ESC  MENU  DISPLAY

Fig. 11

SCREEN 6

KINDS OF PRODUCT MENU

| No. | NAME OF PRODUCT | CODE | SCHEDULED PRODUCTION QUANTITY | PRODUCTION PERIOD START ~ END |
|---|---|---|---|---|
| 1. | B 2500 | [0005] | 10,000 CS | 9/3 ~ 9/28 |
| 2. | B 2000 | [0001] | 3,000 CS | 9/10 ~ 9/21 |
| 3. | B 3000 | [0003] | 500 CS | 9/20 ~ 9/21 |
| 4. | | | CS | ~ |
| 5. | | | CS | ~ |
| 6. | | | CS | ~ |
| 7. | | | CS | ~ |
| 8. | | | CS | ~ |
| 9. | | | CS | ~ |
| 10. | | | CS | ~ |

PLEASE DEPRESS FUNCTION KEY

SCHEDULE REGISTRATION / POSSIBILITY INQUIRY / PROGRESS INQUIRY

OUTLET SETTING / INLET SETTING / WORK PROCESSING

NEXT PAGE / END

Fig. 12

PRODUCTION PROGRESSING STATE INQUIRY

| No. | NAME OF PRODUCT CODE | SCHEDULED PRODUCTION QUANTITY | PRODUCTION PAST RECORD TOTAL | PRODUCTION OPERATION UNDERGOING | PRODUCIBLE QUANTITY | DEGREE OF PRODUCTION PROGRESS | PRODUCTION PERIOD START ~ END |
|---|---|---|---|---|---|---|---|
| | | CS | CS | CS | CS | % | |
| 1. | B 2500 [0005] | 10000 | 400 | 100 | 2000 | 4 | 9/3 ~ 9/28 |
| 2. | B 2000 [0001] | 3000 | 0 | 0 | 2000 | 0 | 9/10 ~ 9/21 |
| 3. | B 3000 [0003] | 500 | 0 | 0 | 400 | 0 | 9/20 ~ 9/21 |
| 4. | | | | | | | |
| 5. | | | | | | | |
| 6. | | | | | | | |
| 7. | | | | | | | |
| 8. | | | | | | | |
| 9. | | | | | | | |
| 10. | | | | | | | |

PLEASE DEPRESS FUNCTION KEY

NEXT PAGE     MENU

SCREEN 62

Fig. 13

SCREEN 61

PRODUCIBLE QUANTITY INQUIRY

| NAME OF PRODUCT | CODE | SCHEDULED PRODUCTION QUANTITY | PRODUCTION PAST RECORD TOTAL | PRODUCIBLE QUANTITY | PRODUCTION OPERATION UNDERGOING | SIMPLE ONE DAY PRODUCTION QUANTITY |
|---|---|---|---|---|---|---|
| B 2500 | (0005) | 10,000 | 400 | 2,000 | 100 | 526 |

| No. | NAME OF MATERIAL | CODE | SCHEDULED MATERIAL PROCURED QUANTITY | | MATERIAL OUTLET PAST RECORD TOTAL | | MATERIAL RACK STOCK | | MATERIAL SHORTAGE | | COMMON MATERIAL |
|---|---|---|---|---|---|---|---|---|---|---|---|
| | | | CS | | PL | CS | CS | | CS | | |
| 1. | A-1 1.8kg | [0505] | 2,000 | | 2 | ( 100) | 400 | | 1,500 | | * |
| 2. | A-2 1/3 | [0501] | 1,280 | | 2 | ( 80) | 1,200 | | 0 | | |
| 3. | A-3 | [0800] | 600 | | 1 | ( 30) | 570 | | 0 | | |
| 4. | A-4 | [1005] | 30,000 | | 13 | (1,560) | 28,440 | | 0 | | |
| 5. | A-5 | [1105] | 10,000 | | 1 | ( 500) | 9,500 | | 0 | | |
| 6. | | | | | | | | | | | |
| 7. | | | | | | | | | | | |
| 8. | | | | | | | | | | | |
| 9. | | | | | | | | | | | |
| 10. | | | | | | | | | | | |

PLEASE DEPRESS FUNCTION KEY

NEXT PAGE | | | | | END

Fig. 14

**\*\* COMMON MATERIAL TABLE \*\***

LIST 7

| COMMON MATERIAL NAME | CODE | | RACK STOCK QUANTITY | | |
|---|---|---|---|---|---|
| A-1 1.8kg | 0505 | | 400 CS | | |

| No. | NAME OF PRODUCT CODE | SCHEDULED PRODUCTION QUANTITY | SCHEDULED PRODUCTION REMAINDER | PRODUCIBLE QUANTITY | REQUIRED QUANTITY OF MATERIAL | PRODUCTION PERIOD START ~ END |
|---|---|---|---|---|---|---|
| 1 | B 2500 0005 | 10,000 | 9,600 | 2,000 | 400 | 9/3 ~ 9/28 |
| 2 | B 2000 0001 | 3,000 | 3,000 | (2,000) | (334) | 9/10 ~ 9/21 |
| 3 | B 3000 0003 | 500 | 500 | (400) | (400) | 9/20 ~ 9/21 |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| 15 | | | | | | |
| 16 | | | | | | |
| 17 | | | | | | |
| 18 | | | | | | |
| 19 | | | | | | |
| 20 | | | | | | |
| TOTAL | | | | | 1,134 CS | |

Fig. 15

SCREEN 512

PRODUCIBLE QUANTITY INQUIRY

| NAME OF PRODUCT | CODE | SCHEDULED PRODUCTION QUANTITY | PRODUCTION PAST RECORD TOTAL | PRODUCIBLE QUANTITY | PRODUCTION OPERATION UNDERGOING | SIMPLE ONE DAY PRODUCTION QUANTITY |
|---|---|---|---|---|---|---|
| B 2500 | (0005) | 10,000 | 400 | 2,000 | 100 | 526 |

| No. | NAME OF MATERIAL | CODE | SCHEDULED MATERIAL PROCURED QUANTITY | | MATERIAL OUTLET PAST RECORD TOTAL | | MATERIAL RACK STOCK | | MATERIAL SHORTAGE | | COMMON MATERIAL |
|---|---|---|---|---|---|---|---|---|---|---|---|
| | | | CS | | PL | CS | CS | | CS | | |
| 1. | A-1 1.8kg | [0505] | 2,000 | | | | | | | | * |
| 2. | A-2 1/3 | [0501] | 1,280 | | 2 | (100) | 400 | | 1,500 | | |
| 3. | A-3 | [0800] | 600 | | 2 | (80) | 1,200 | | 0 | | |
| 4. | A-4 | [1005] | 30,000 | | 1 | (30) | 570 | | 0 | | |
| 5. | A-5 | [1105] | 10,000 | | 13 | (1,560) | 28,440 | | 0 | | |
| 6. | | | | | 1 | (500) | 9,500 | | 0 | | |
| 7. | | | | | | | | | | | |
| 8. | | | | | | | | | | | |
| 9. | | | | | | | | | | | |
| 10. | | | | | | | | | | | |

PLEASE DEPRESS FUNCTION KEY

| POSSIBILITY TABLE | COMMON TABLE | | | | NEXT PAGE | END |

Fig. 16

SCREEN 63

MATERIAL OUTLET SETTING

| NAME OF PRODUCT | CODE | SCHEDULED PRODUCTION QUANTITY | PRODUCTION PAST RECORD TOTAL | PRODUCIBLE QUANTITY | SIMPLE ONE DAY PRODUCTION QUANTITY | PRODUCTION OPERATION UNDERGOING |
|---|---|---|---|---|---|---|
| B 2500 | [0005] | 10,000 | 400 | 2,000 | 526 | 100 |

| No. | NAME OF MATERIAL | CODE | SCHEDULED MATERIAL PROCURED QUANTITY CS | MATERIAL OUTLET PAST RECORD TOTAL PL CS | MATERIAL RACK STOCK CS | OUTLET QUANTITY THIS TIME |
|---|---|---|---|---|---|---|
| 1. | A-1 1.8kg | [0505] | 2,000 | 2 ( 100) | 400 | ( 50) |
| 2. | A-2 1/3 | [0501] | 1,280 | 2 ( 80) | 1,200 | ( 40) |
| 3. | A-3 | [0800] | 600 | 1 ( 30) | 570 | ( 30) |
| 4. | A-4 | [1005] | 30,000 | 13 (1,560) | 28,440 | 6 ( 720) |
| 5. | A-5 | [1105] | 10,000 | 1 ( 500) | 9,500 | 1 ( 500) |
| 6. | | | | | | ( ) |
| 7. | | | | | | ( ) |
| 8. | | | | | | ( ) |
| 9. | | | | | | ( ) |
| 10. | | | | | | ( ) |

CONFIRMATION ☐     250CS PRODUCTION EXECUTION QUANTITY

| INPUT | ADD | | | | | NEXT PAGE | END |

Fig. 17

SCREEN 64

PRODUCT INLET SETTING

| No. | P L | NAME OF PRODUCT | CODE | FULL QUANTITY | PRODUCTION PERIOD START ~ END |
|---|---|---|---|---|---|
| 1. | B | 2500 | [0005] | 40 CS/PL | 9/3 ~ 9/28 |
| 2. | B | 2000 | [0001] | 24 CS/PL | 9/10 ~ 9/21 |
| 3. | B | 3000 | [0003] | 18 CS/PL | 9/20 ~ 9/21 |
| 4. | | | | — CS/PL | — / — ~ — / — |
| 5. | | | | — CS/PL | — / — ~ — / — |
| 6. | | | | — CS/PL | — / — ~ — / — |
| 7. | | | | — CS/PL | — / — ~ — / — |
| 8. | | | | — CS/PL | — / — ~ — / — |
| 9. | | | | — CS/PL | — / — ~ — / — |
| 10. | | | | — CS/PL | — / — ~ — / — |

MENU No. : 1 /    B   2500   0005
QUANTITY : (☐40)
CONFIRMATION : Y/N

INPUT     NEXT PAGE     MENU

Fig. 18

```
* * * SHORT PRODUCT INLET ALARM * * *
NAME OF
MATERIAL    CODE      NAME OF PRODUCT    CODE
-----------------------------------------------
A-1  1.8kg  (0505)    B        2500     (0005)
```

LIST 3

PRODUCTION EXECUTION METHOD

BACKGROUND OF THE INVENTION

1. Field of the Invention

This invention relates to a production execution method for producing goods comprised of various kinds of material and particularly to a production execution method capable of rapidly taking out all material necessary for production, from storage facilities at the starting time of production, and executing production of the production execution quantity in sequence.

2. Description of the Background Art

As conventional technologies relating to a production execution method, there are known those which are described, for example, in Japanese Patent Early Laid-open Publication No. Sho 63-306861, and in UNMANNED TRANSPORTATION SYSTEM GUIDEBOOK issued by Distribution Research Co. (Ryutsu Kenkyu Sha) on Jul. 20, 1986, p. 114–120, under Subtitle of "UNMANNED TRANSPORTATION SYSTEM SEEN IN AUTOMOBILE/MACHINERY FACTORIES OF SYSTEM CASE NUMBER 3" (hereinafter referred to as "Unmanned Transportation System Guidebook").

The conventional technologies described in the above mentioned publication, etc. will now be described. Japanese Patent Early Laid-open Publication No. Sho 63-306861 discloses a method for making and amending a production schedule, in which a supply quantity for each part (material, etc. and a consumption quantity required for assembly are found in time series from a part supply schedule. The part supply schedule is developed with reference to a product constitution file information under a production schedule of products (goods) in view of facilities specification file information and part stock file information. The production schedules are guidance displayed on a displayer so that they can be easily compared. A warning is output when the consumption quantity has exceeded the supply quantity and the production schedule of products is automatically amended.

Also, Unmanned Transportation System Guidebook referenced above describes an automobile body assembling line, which executes production in such a manner as that goods (material, etc.) required for production are made beforehand. Those goods which have been made beforehand are palletized for each kind, lot and destination and thereafter, are stored in a miniature automatic warehouse of a temporary storage type. A pallet of the pertinent kind is then automatically taken out of the warehouse and automatically supplied to a (production) main line in synchronism with consumption on the main line.

However, the above-mentioned conventional technologies have the following problems.

That is, the production schedule making and amending method described in Japanese Patent Early Laid-open Publication No. Sho 63-306861 is designed such that the production schedule of goods is automatically amended (reduced) based on quantity of material which are already stocked. However, it does not teach nor even suggest at all that after the quantity equal to or below the quantity which can be produced (hereinafter referred to as the "producible quantity") is decided as a production execution quantity, such decided production execution quantity is set and divided into two or more smaller quantities, and material which will be required for each quantity which has been set, are taken out of the storage facilities for each setting.

On the other hand, the automobile body assembling line described in Unmanned Transportation System Guidebook is designed such that it is a necessary assumption for executing production that the required material are either already procured or already in stock, and on the foregoing assumption, a pallet for the pertinent kind of goods is automatically taken out of the warehouse and supplied to the main line in synchronism with consumption on the main line. However, it does not disclose nor even suggest that the producible quantity of material is calculated based on the quantity of material already procured or already in stock.

SUMMARY OF THE INVENTION

It is therefore an object of the present invention to provide a production execution method, in which in order to produce a production execution quantity of goods which is to be decided based the quantity of material already procured or already in stock, such decided production execution quantity is set be being divided into two or more smaller quantities (hereinafter referred to as the "set quantity"). A required quantity of material for each set quantity is taken out of storage facilities, so that production of the above-decided production execution quantity can be executed in sequence. Particularly, the present invention intends to provide a production execution method which is capable of rapidly and efficiently taking out a required goods-composing material from storage facilities by increasing the required material to the unit of plural cases (or pallet) which are already in stock.

The present invention has achieved the above object by providing a production execution method comprising the steps of storing at least one kind of material among various kinds of material stored as goods in storage facilities; calculating a producible quantity of the goods based on an already procured quantity or already stocked quantity of the various kinds of material through a calculation processor; deciding a quantity equal to or below the producible quantity as a production execution quantity; setting the production execution quantity by dividing it into two or more smaller quantities; and taking out a required quantity of the material from the storage facilities for each set quantity for each setting so that production of the decided production execution quantity of goods can be executed in sequence.

It is preferable that material are stored in the storage facilities in the unit of plural cases (or pallet) and the material required for producing the goods are taken out by increasing to the unit of plural cases (or pallet).

According to a production execution method of the present invention, when goods composed of a plural kinds of material are produced, a production execution quantity chosen based on an already procured quantity or already stocked quantity of material is set divided two or more times in order to produce the production execution quantity of goods. Material required for each set quantity is taken out of the storage facility for each setting, thereby to execute production of such decided production execution quantity of goods in sequence. Particularly, since the required material is taken out by increasing to the unit of plural cases already in stock, all material required for production of goods can be rapidly taken out of the storage facility at the starting time of production. Production of the production execution quantity of goods can be executed in sequence, thus an efficient production can be realized without loss in time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 5 is a flow chart showing the detail of setting operation of material, etc. for inlet;

FIGS. 6a and 6b are block diagrams of a screen displayed on a displayer;

FIGS. 7, 8, 9, 10, 11, 12, 13, 15, 16 and 17 are detailed views of the screen displayed on the displayer; and FIGS. 14 and 18 are detailed views of a list output by a printer.

DETAILED DESCRIPTION OF THE INVENTION

One embodiment of a production facilities capable of carrying out a production execution method of the present invention will be described first.

Figure 1:
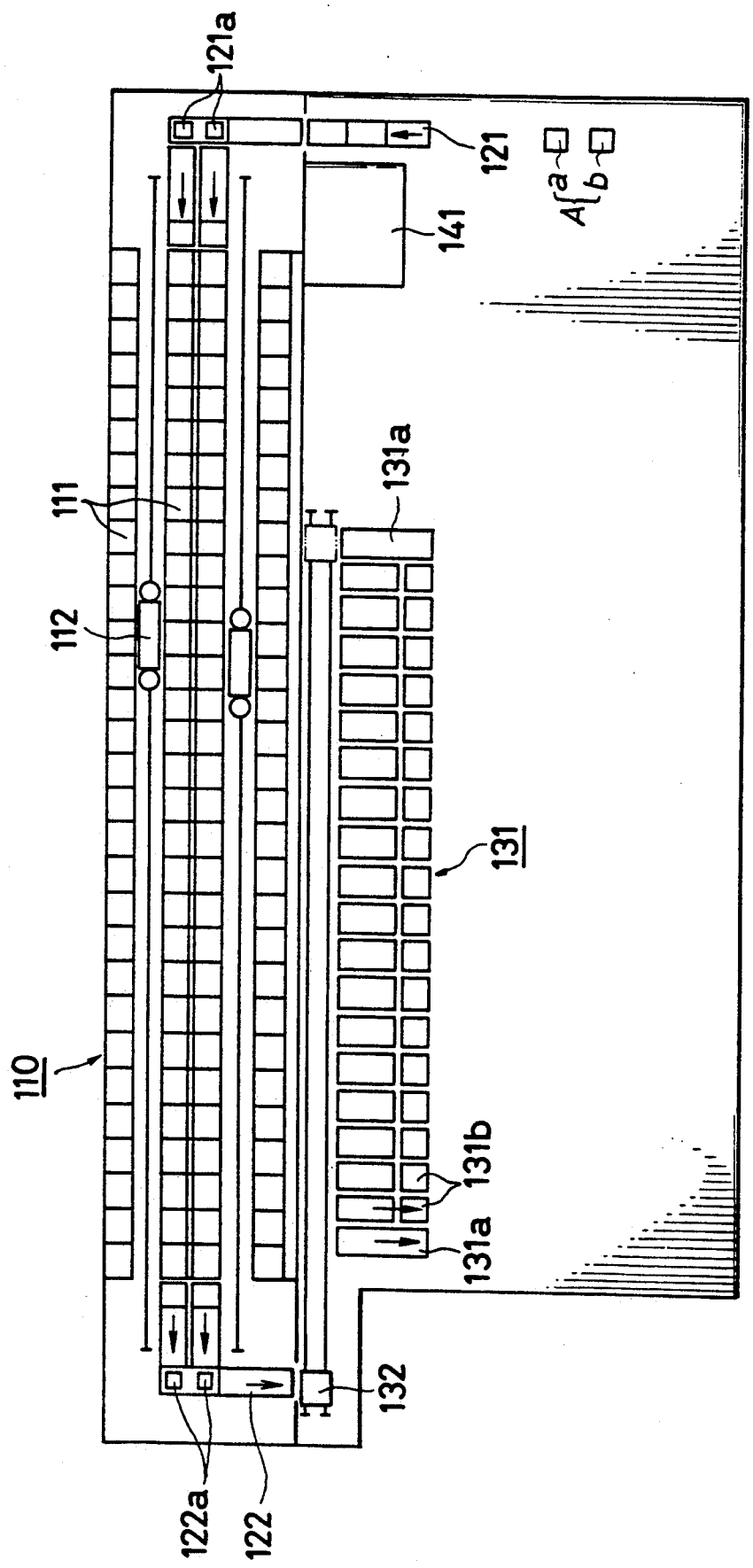
FIG. 1 is a schematic horizontal sectional view of a first stage showing one embodiment of a production facility which is capable of carrying out a production execution method of the present invention.
Figure 2:
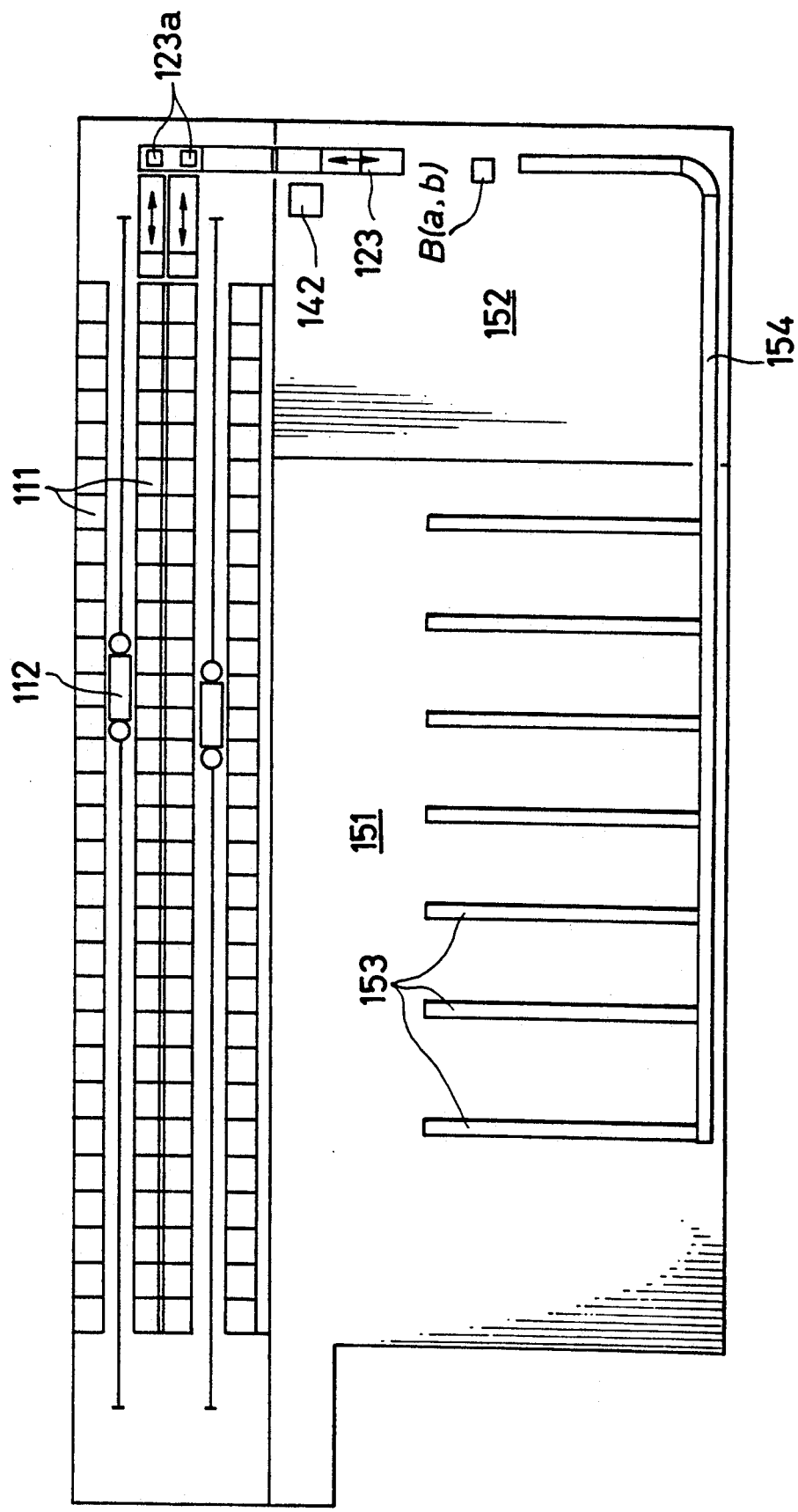
FIG. 2 is a schematic horizontal sectional view of a second stage thereof.

FIG. 1 is a schematic horizontal sectional view of a first stage of a production facility, and FIG. 2 is a schematic horizontal sectional view of a second stage thereof. In the Figures, the numeral 111 denotes storing racks arranged multi-row and in multi-stage in the height direction, and 112 denotes stacker cranes each of which travels rightward and leftward in a space formed between the adjacent storing racks 111 in order to carry material A in and out as will be described hereinafter with respect to the storing racks 111. These storing racks 111, stacker cranes 112, and the like constitute a storage facility (automatic warehouse). An inlet conveyor 121 for carrying material A into the storing racks 111 is connected to an inlet port disposed on the first stage with respect to first ends of the storing racks 111, while an outlet conveyor 122 for carrying out goods (products) B, which are produced at the second stage as will be described hereinafter, is connected to an outlet port opposed to the inlet port at the other ends of the storing racks 111. Also, an inlet/outlet conveyor 123 for carrying out the materials A required for producing the products B and for carrying in the products B which have been produced is connected to an inlet/outlet port disposed at the second stage with respect to the storing racks 111. The reference numerals 121a, 122a and 123a denote transfers for transferring the material A or the products B in the right angle direction. Also, a traverser 132 for transferring the products B, which have been carried out of the storing racks 111, to desired goods assorting/assembling lines 131, 131, . . . is disposed at the downstream end of the outlet conveyor 122 on the first stage. Goods assorting/assembling lines 131a, 131a disposed on both end portions among all of the goods assorting/assembling lines 131, 131, . . . are direct shipping lines for directly shipping the products B which have been carried out of the storing racks 111, and all the remaining goods assorting/assembling lines 131b, 131b, . . . are pallet flow conveyors for assorting and assembling the products B which have been carried out of the storing racks 111.

In FIG. 2, the numeral 151 denotes a production area for producing the products B by combining the material A which have been carried out of the storing racks 111 through the inlet/outlet conveyor 123. The numeral 152 denotes a palletize area for palletizing the products B which have been produced in the production area 151. The production area 151 is provided with seven production conveyor lines 153. A transfer conveyor line 154 for transferring the products B is disposed in such a manner as to connect the respective production conveyor lines 153 to the palletizing area 152.

Figure 3:
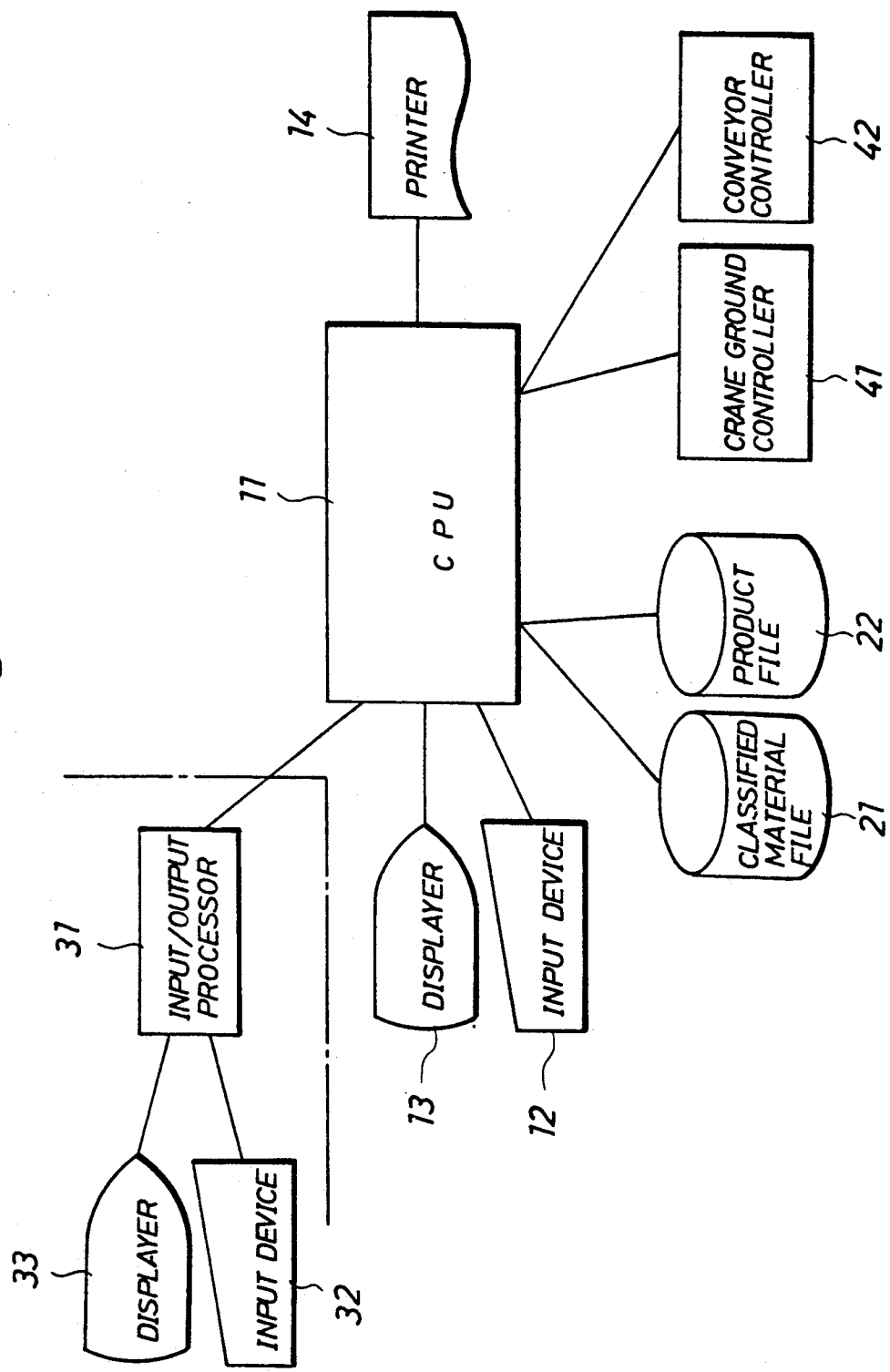
FIG. 3 is a block diagram of a control system suitably used when the production execution method of the present invention is carried out.

A control system suitable for carrying out the production execution method of the present invention, as shown in FIG. 3, comprises a central processing unit (CPU) 1 disposed in a computer control room (CCR) 141 on the first floor, an input device 12 comprising a keyboard, a displayer 13, a printer 14, a file 21 classified by each material (hereinafter referred to as the "classified material file") as an already procured material file or as an already stocked material file, an input/output processing device 31, an input device 32, a displayer 33, and the like disposed in an inlet/outlet setting place 142 on the second stage. The CCR 141 is provided with a crane ground controller 41 for controlling the stacker crane 112, and a conveyor controller 42 for controlling an inlet conveyor 121, an outlet conveyor 122, an inlet/outlet conveyor 123, a goods assorting/ assembling line 131, and a traverser 132. The crane ground controller 41 and the conveyor controller 42 control them in accordance with output commands from the CPU 11.

Next, preparation of a production schedule to which a production execution method of the present invention is applied and the outline of production work will be described.

Regarding the delivery or procurement of the material A delivery instructions for material a composing the product B and supplying instructions for component products composing the product B are given to a material dealer and a product supplier based on a monthly production schedule which is made beforehand in a production schedule making system of a host computer (not shown). The instructed material A, material a, and products b, are procured by the designated time. Such procured material A are, in principle, procured in a unit load state at the time the material A are carried and stored in the automatic warehouse 110, that is, a state where the material A are palletized in the unit of plural cases. However, the material A, which have been procured in the unit of one case are palletized in a suitable unit in accordance with necessity before they are carried into the automatic warehouse 110. The material A, which have been brought into a unit load state prior to storing time, are carried into the storing racks 111 through the inlet conveyor 121 and the stacker crane 112 and stored. The material A, which have been taken out of the storing racks for production, are kept in the production area 151. Since the already procured quantity of such material A and the already stocked quantity in the storing racks 111 and production area 151 are memorized in the classified material file 21, the production operator calculates and checks whether all material A required for producing a desired production quantity of products B in that day or at that time are procured and stored in the storing racks 111 or in the production area 151 using the CPU 11 based on the monthly production schedule. If there are material A which are in short supply, the currently producible quantity of goods B is calculated and a production schedule, in which a desired quantity equal to or below the producible quantity is input from the input device 12 as a scheduled quantity of that day or that time to determine the size (production execution quantity) of a production lot. In case there is a shortage of material A for producing a desired production quantity of products B, the material A, which are in short supply the most, are memorized in the CPU 11.

When a production execution quantity different from the desired production quantity to be produced in that day or that time is decided and the production of one product B is set to the CPU 11 as a part of the production execution quantity first, the quantity of each material A required for producing one product B set by the CPU 11 is calculated. The calculated quantity for each required material A is increased to the unit of plural cases, i.e., in the unit of the unit load state of each required material A when the material A was carried into the automatic warehouse 110 and each material A is carried out of the storing racks 111 through the stacker crane 112 and the inlet/outlet conveyor 123. Then, each such carried out material A is transferred to the production area 151 by the operator and the production of the products B is started as scheduled. Accordingly, by setting the production of a small quantity of products B, the time from the decision of the production execution quantity of products B to the start-up of production can be shortened. When the production of a certain product B is started based on the monthly production schedule, the required material A are usually not stored in the production area 151. However, by setting the production of one case of product B, each required material A is carried out by one unit (pallet) portion in the unit load state when the material A is carried into the automatic warehouse 110 and the material A required for production are rapidly carried out as mentioned above. Accordingly, the time from the setting of the production execution quantity of products B to the start of production can be shortened and the production can be started immediately. Also, when the remaining quantity of the decided production execution quantity, i.e., the quantity of (production execution quantity − 1) cases, is set following the previous setting operation, the quantity of each material A required for producing the remaining products B set by the CPU 11 separately from the previous setting operation is calculated, and each calculated quantity is increased, to the unit of plural cases stored, i.e., the unit of the unit load state when the material A are carried in the automatic warehouse 110. Then, each material A is carried out from the storing racks 111 through the stacker crane 112 and the inlet/outlet conveyor 123 while the production is undergoing using the material A which have been previously carried out. Accordingly, the production execution quantity of products B can be produced in sequence and without loss of time. When the material A required for production remains in the production area 151, it goes without saying that the required material A are not carried out from the storing racks 111. The products B for which production has been finished are transferred to the palletizing area 152 by the transfer conveyor 154 and palletized. Such palletized products B are set for inlet (or set for storage) by the input device 32 installed in the inlet/outlet setting place 142 and stored in the storing racks 111 through the inlet/outlet conveyor 123 and the stacker crane 112.

The work for making the above-mentioned production schedule and the work for production thereof are, in principle, sequentially repeated based on the monthly production schedule until the quantity of production of the same kinds of products B reaches the monthly scheduled production quantity.

Such produced products B are transferred to the assorting/assembling line 131 on the first stage on or before the scheduled shipping date or delivery date and delivered after they are properly assorted and assembled.

Figure 4:
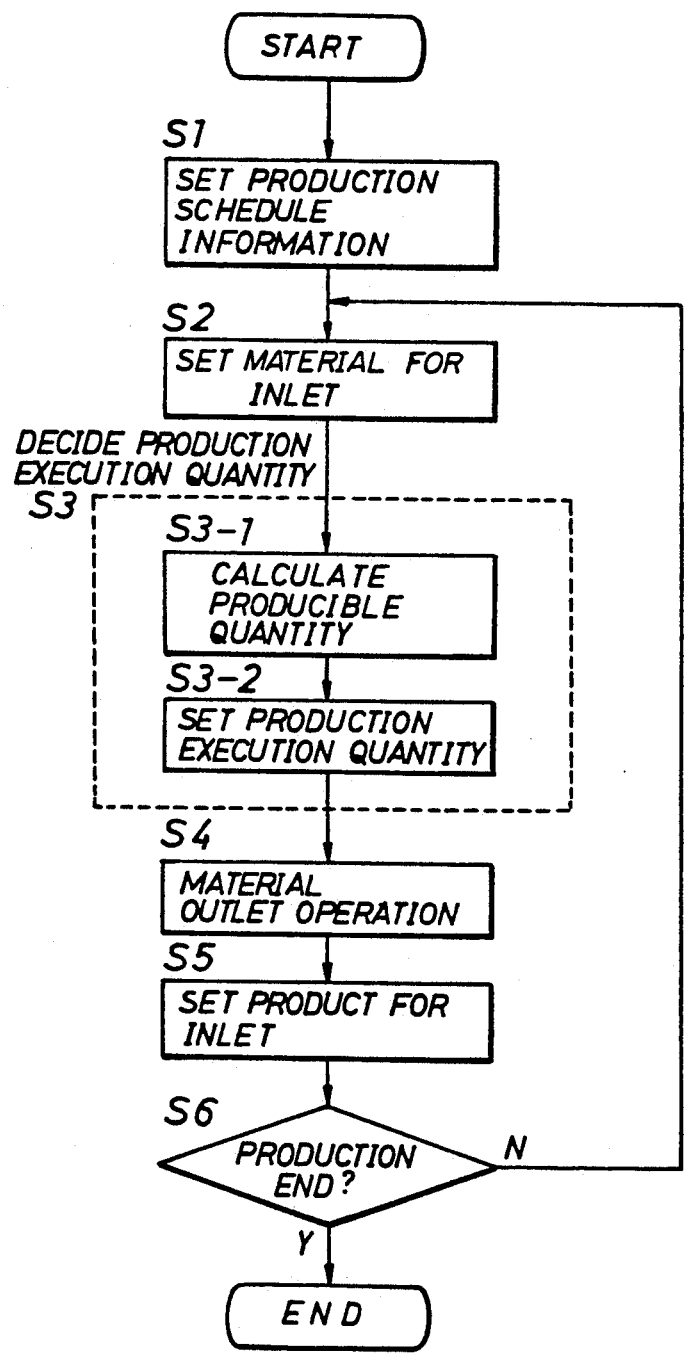
FIG. 4 is a flow chart showing the outline of one embodiment of the production execution method of the present invention.
Figure 6A:
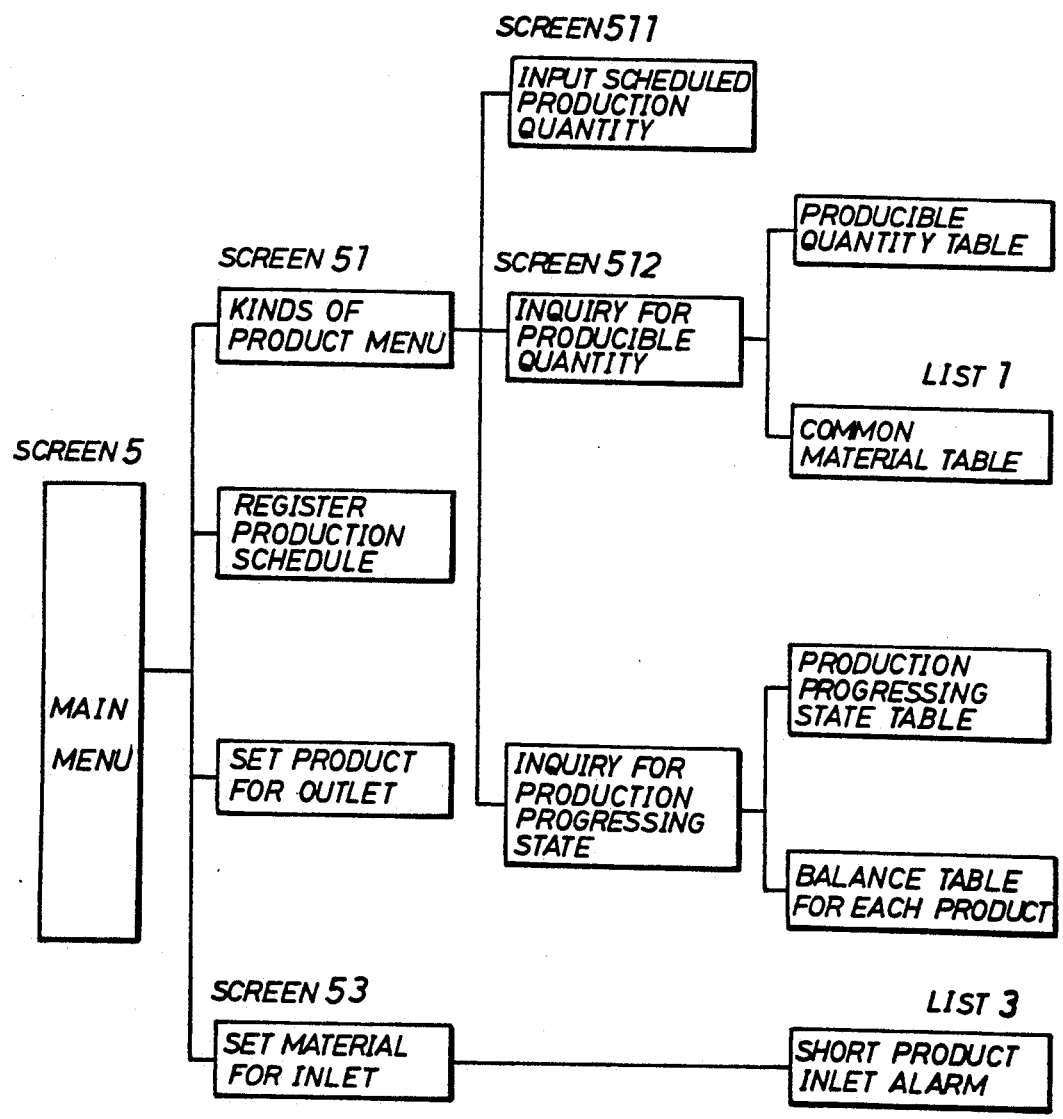

Next, one mode for carrying out a production execution method of the present invention, for making a production schedule to which the method of the present invention is applied and for carrying out the production according to the production schedule will be described in detail with reference to FIGS. 4 through 18. Among the Figures, FIG. 4 is a flow chart showing one mode for carrying out the production execution method of the present invention, FIG. 5 is a flow chart showing the detail of the setting operation of material for inlet in FIG. 4, FIGS. 6a and 6b are block diagrams of operation screens displayed by the displayers 13 and 33, FIGS. 7 through 13 and FIGS. 15 through 17 are views showing the details of the screens displayed by the displayers 13 and 33, and FIGS. 14 and 18 are views showing the details of the lists output by the printer respectively. Date, time, etc. are omitted from the screens and lists shown in FIGS. 7 through 18.

First, the production schedule information is set to the CPU 11 as a production preparation procedure (step 1). More specifically, the setting operation of the production schedule information is carried out as follows. First of all, the menu of "production schedule registration" is selected (input No. 10 by the input device 12) from the "main menu" screen of the screen 5 displayed by the displayer 13 (see FIG. 7). Then in accordance with the instructions of the "production schedule registration" screen (not shown), a floppy disk, in which information of a monthly production schedule made beforehand by a production schedule system of a host computer, i.e., information of a monthly production schedule made by a management computer (not shown) of a production management department is input, is set in the CPU 11 and the monthly production schedule is registered to the product file 22. This monthly production schedule includes names (product codes) of the products B, production quantity thereof (scheduled production quantity), production period (scheduled starting date and scheduled finishing date), names (product codes) of the material A forming the product B and required quantity of each material and procured quantity of the material A. When the "kinds of product menu" is selected (input No. 9 by the input device 12) from the "main menu" screen of the screen 5 after the registration and the "kinds of product menu" of the screen 51 is opened, the screen is displayed as in FIG. 8. The production schedule information is not limited to the above-mentioned method. The above-mentioned content may be input using the keyboard of the input device 12. That is, the "kinds of product menu" is selected from the "main menu" screen of the screen 5 to open the "kinds of product menu," screen of the screen 51 and then the function key of the input device 12 corresponding to the indication of "schedule registration" on the left lower part of the screen is depressed. As a result, the "scheduled production quantity input" screen of the screen 511 shown in FIG. 9 is displayed on the displayer 13, and names (product codes) of the products B, production quantity thereof (scheduled production quantity), production period (scheduled starting date and scheduled finishing date), names (product codes) of the material A forming the product B and required quantity of each material and procured quantity of the material A can be input by the input device 12. When product codes are input on the screen 511, the CPU 11 searches the product names and material names of the corresponding products B and material A in accordance with the "product name master" which are registered in the classified material file 21 beforehand and displays them on the screen 511.

When the material A, for which the production management department has issued delivery instructions, are procured in the state where the production schedule information is set in the step 1, setting operation for inlet is performed for the procured material A using the input device 12 (step 2). By this setting operation for inlet, a procurement actual record quantity is added to the "already procured quantity" for each material A of the classified material file 21, and such procured material A are stored in the storing racks 111 through the inlet conveyor 121 and the stacker crane 112. The material A are palletized for each material A and then carried and stored in the automatic warehouse 110 in the foregoing state. At this time, the material A are usually palletized in the unit of plural cases. However, it goes without saying that only one case of material A may be loaded on the pallet. In the setting operation for inlet in the step 2, when the material A enabling to increase the producible quantity are procured, it is indicated that the production schedule can now be amended as will be described hereinafter. That is, concretely, the usual setting operation for inlet is performed as follows. First, the "setting operation for inlet" is selected from the "main menu," screen of the screen 5 shown in FIG. 7 (No. 1 is input by the input device 12) to open the "setting operation of material for inlet" screen of the screen 53 shown in FIG. 10. When the product codes of the material A which are to be carried in are input, the right product names are indicated. Then, the inlet quantity (number of cases) is input and if the input content is correct, the confirmation (Y) is input. As a result, the content of the setting operation for inlet is displayed in the table on the screen 53.

Next, the production execution quantity of the products B which are to be produced in that day or that time is decided (step 3). This operation is performed using the input/output processing device 31, the input device 32 and the displayer 33 which are installed in the inlet/outlet setting place 142. At that time, prior to the decision of the production execution quantity, the state of procurement of the material A is confirmed by the following operation. First, the function key of the input device 32 corresponding to the indication of the "inquiry for progress" at, the lower left part of the "kinds of product menu" screen (see FIG. 11) of the screen 6 displayed on the displayer 33 is depressed to display the "inquiry for production progressing state" screen (see FIG. 12) of the screen 62 and the production state so far processed is confirmed as a criterion for deciding the production execution quantity first. With respect to the products B for which there are not yet procured material A for producing the monthly scheduled production quantity, it is checked here about the material a or product b which is in short supply among the material A composing the product B by depressing the function key of the input device 32 corresponding to the indication of the "inquiry for possibility" display at the lower left part of the "kinds of product menu" screen of the screen 6 shown in FIG. 11 and opening the "inquiry for producible quantity" screen (see FIG. 13) of the screen 61. The display of the material A which is in shortest supply, that is, the short quantity of material for the material A which prevails the most significant affection for limiting the producible quantity is displayed in "red." The material A attached with the "*" mark in a column of common material in FIG. 13 indicates that the material A is a common material which can be used for a plurality of products B. When the common material A are in short supply, the "common material table (see FIG. 14)" of the list 1 is output on the CCR 141 to check a plurality of products B to which said material A are to be used and it depends on the operator's judgment to decide the detail about how to allot said material A to each product B. The output of the list 1 is output to the printer 14 by displaying the "kinds of product menu" screen (see FIG. 8) of the screen 51 on the displayer 13, depressing the function key of the input device 12 corresponding to the display on the lower left part (inquiry for possibility) of the screen, displaying the "inquiry for producible quantity" screen (see FIG. 15) of the screen 512, depressing the function key of the input device 12 corresponding to the indication of the "common table" at the lower left part of the screen 512, and inputting the product codes of the common material A desired to output the list 1.

After confirming the procuring state of the material A in the manner as mentioned above, the production execution quantity is decided and such decided production execution quantity is set by dividing it into two smaller quantities. That is, decision of the production execution quantity and the setting operation are performed concretely in the following manner. First, by depressing the function key of the input device 32 corresponding to the indication of the "setting operation for outlet" at the lower middle part of the screen 6 shown in FIG. 11 to input the relevant No. of the product name to be produced, the "material setting operation for outlet" screen (see FIG. 16) of the screen 63 is displayed on the displayer 33. Since the producible quantity of the products B is the minimum value in the producible quantity for each material A used for the products B and calculated in accordance with the equation (1) set forth hereunder, the minimum value is displayed in the column of the "Producible quantity" of the screen 63 (step 3-1).

$$\alpha = (\beta/\gamma) \times \delta - \epsilon \tag{1}$$

wherein
α: producible quantity for each material
β: already procured quantity
γ: scheduled material procuring quantity
δ: monthly scheduled production quantity
ε: total of production execution quantity Therefore, by serving the "simple one day production quantity" calculated based an the production progressing state of the products B and the monthly production schedule checked with the "inquiry for production progressing state" of the screen 62 shown in FIG. 12 and displayed on the screen 61 (see FIG. 13) as a criterion, the operator confirms the producible quantity calculated in the step 3-1 and decides the production execution quantity in that day or that time, and then, the production execution quantity is set through the input device 32 by dividing it into two smaller quantities (step 3-2). Then, each such set quantity is added to the "total production execution quantity" of the product file 22.

For example, presuming that the production execution quantity is decided as 251 cases and the quantities set by being divided into two quantities of 1 case and 250 cases respectively, firstly, the quantity of the material A required to be carried out of the storing racks 111 for 1 case setting is calculated for each material A in accordance with the equation (2) set forth hereunder in the unit of case. Then, such calculated required quantity is registered in the classified material file 21 and increased to the unit of unit load state at the time they are stored. Such required increased quantity is displayed in the column of "outlet quantity this time (quantity to be carried out this time)" (see FIG. 16) of the screen 63. Accordingly, when the confirmation (Y) is input if the content of the display is correct, displayed material A are carried out of the storing racks 111. Then the required quantity of a certain material for outlet A calculated in accordance with the equation (2) set forth hereunder is 0 or a negative number, it means that the relevant material A required for producing the products B which have been set are already carried out of the storing racks 111 and kept in the production area 151, and those material A are not carried out of the storing racks 111.

$$\phi = (\epsilon/\delta) \times \gamma - \omega \qquad (2)$$

wherein
φ: required quantity of material for outlet
ε: total of production execution quantity
δ: monthly scheduled production quantity
γ: scheduled material procuring quantity
ω: total of already carried-out quantity of material Accordingly, in spite of the production execution quantity of the products B set by the CPU 11, the material A required for the production of the products B can be carried out in the unit load state of the time they were carried in and stored in the automatic warehouse 110 and can be supplied to the production area 151 using a fork lift o the like.

Accordingly, the material A can be rapidly and efficiently handled in one lot. The outlet instructions (carry out instructions) of the material A is output to the crane ground controller 41 and the material A are carried out to the production area 151 through the stacker crane 112 and the inlet/outlet conveyor 123 (step 4). When operation for outlet of the material A is ended, already carried out quantity of the material A is added to the "total of already carried-out quantity" of the product file 22 and the column of "total of past outlet record of material" of the screen 61 is corrected.

Following the setting operation of the production of 1 case of product B, as is shown in FIG. 16, the remaining quantity of 250 cases are set, the required quantity of the material A which are to be carried out of the storing racks 111, is calculated in the unit of each case for each material A by the CPU 11, such calculated required quantity is increased to the unit of the unit load state at the time is stored in one lot and then carried out of the storing racks 111. When the material A have been carried out of storing racks 111, the already carried out quantity of the material A is added to the "total of already carried out quantity" of the product file 22 as in the case of 1 case. Accordingly, if the production execution quantity is set by being divided into two quantities, i.e., 1 case and 250 cases, all material A required for the start of production are carried out by being divided into two quantities. That is, each material A required for producing 1 case of product B is carried out rapidly by one pallet portion first to start the production of product B immediately, and the material A required for producing the remaining products B are carried out of the storing racks 111 while the production using the material A which have been carried out previously is undergoing. Accordingly, the products B decided as the production execution quantity can be produced in sequence and without interruption. Thus, there can be realized an efficient production without loss of time. When the production execution quantity is set, the second time set quantity, i.e., 250 cases can be set before the material A required for the products B for the first time set quantity, i.e., 1 case setting have been carried out. Also, in case the first set quantity is 1 case, if a small quantity of material A remaining in the production area 151, there is a possibility that any of the relevant material A in the column of the "carried-out quantity this time" of FIG. 16 is displayed as "carried-out quantity is none," i.e., "0 PL." In this case, it is preferable that by resetting a proper quantity, all material A can be carried out by one pallet portion at least in the unit of the unit load state at the time the material A are stored.

After being palletized, the products B produced using the material A which have been carried out for production is placed on the inlet/outlet conveyor 123, and product names (product codes) and quantity are set for inlet through the input device 32 (step 5). Such products B set for inlet are carried in the storing racks 111 by the stacker crane 112 through the inlet/outlet conveyor 123. That is, setting operation of the products B for inlet is carried out concretely in the following manner. First, by depressing the function key of the input device 32 corresponding to the "setting operation for inlet" display at a lower middle part of the "kinds of product menu" screen of the screen 6 displayed by the displayer 33 using the input device 32, the "setting operation of product for inlet" screen (see FIG. 17) of the screen 64 is opened and the relevant product No. is selected among the product names displayed in the screen 64 and the inlet quantity is input. Then, if the content of input is correct, the confirmation "Y" is input to effect the setting operation for inlet. When the products B are carried into the storing racks 111 in accordance with the setting operation, the inlet quantity is added to the product file 22 as a past production record and the column of the "total of past record of production" of the screen 61 is corrected each time.

Then, it is confirmed whether the total of past record of production reaches the monthly scheduled production quantity or not (step 6), and if not, it returns to step 2 and repeats the procedures of step 2 to step 5 until the total reaches the scheduled production quantity. In this way, production of the same kinds of goods B is repeated until the production of the monthly production schedule for the products B is ended.

FIGS. 6a and 6b show the summary of the content displayed as a result of operation of the respective function keys in the displayers 13 and 33 as mentioned above.

The setting operation of the material for inlet in step 2 will now be described in more detail with reference to FIG. 5. After placing the procured material A on the inlet conveyor 121, the operator inputs the product names (product codes) and quantity of the material A for inlet through the input device 12 first. That is, the operator selects (inputs No. 1 through the input device 12) the "setting operation for inlet" from the "main menu" screen of the screen 5 shown in FIG. 7 displayed by the displayer 13 to open the "setting operation of material for inlet" screen of the screen 53 shown in FIG. 10 and then inputs the product codes of the material A for inlet. By this, the relevant product names are displayed. Then, he inputs the quantity for inlet. If the content of input is correct, he further inputs the confirmation "Y" (step 2-1). When the setting operation for inlet is finished, the storing rack or racks 111 are decided by the CPU 11 for the material A for inlet (step 2-2), and the addresses of such decided storing racks 111 are output to the stacker crane 112 through the crane ground controller 41 (step 2-3). After the instructions for inlet is output to the stacker crane 112, the inlet quantity of the material A is added to the "already procured quantity" of the classified, material file 21 to renew the "already procured quantity" (step 2-4).

In case material A enabling, to increase the producible quantity are procured while the production of a certain product B is undergoing, a short product flag is affixed to the column of the relevant material A of the "material No. table" stored in the inner memory of the CPU 11, that is, the column of the material A enabling to increase the producible quantity by being procured thereafter in order to inform (alarm) that the production schedule can now be amended (increased). Accordingly, when the material A are procured, it is checked whether the short product flag is affixed to such procured material A or not (step 2-5). When it is confirmed that the short product flag is affixed to the procured material, etc A, it is also checked whether the short product flag is affixed to other material A composing the products B under production or not, in other words, it is checked whether a plurality of short product flags are affixed or not (step 2-6). If it is confirmed that the short product flag is not affixed to the aforementioned other material A, an alarm informing that the production execution quantity of the products B under production can now be amended (increased) is output, in other words, the "short product inlet alarm (see FIG. 18)" of the list 3 is output (step 2-7). Therefore, the operator can know that the producible quantity of the product B now under production was increased. When the list 3 is output, the short product flag affixed to the column of the pertinent material A of the "material No. table" is erased (step 2-8). Also in step 2-6, if the short product flag is affixed to other material A composing the product B under production, the short product flag affixed to the procured material A is erased without executing step 2-7 (step 2-8). However, the short product flag affixed to the column of the aforementioned other material A is not erased and the alarm is not output. After the short product flag is erased, the producible quantity for each material A of the product B under production is calculated (step 2-9). If there is still unprocured material A, a short product flag is affixed to the column of the pertinent material A of the "material No. table" newly calculated, in other words, the column of the material A enabling to increase the producible quantity by being procured thereafter, and the short product flag is renewed (step 2-10). If no short product flag is affixed to the material A procured in step 2-5, the producible quantity for each material of the product B under production is calculated without executing steps 2-6 through 2-8. Therefore, the operator can amend (increase) the producible quantity of the pertinent product B in accordance with the "short product inlet alarm" of the list 3 without delay and attain an efficient production.

Although the description has been described in accordance with a series of flow as shown in FIG. 4 in order to facilitate an easy understanding of the overall flow of operation during the production period, actually the respective steps can be executed in multitask. For example, steps 2 and 3, steps 2 and 4, or steps 2 and 5 can be executed in parallel. Also, the respective steps can be executed any time in accordance with necessity.

The production execution method of the present invention is not limited to the above-mentioned embodiments. For example, instead of the method in which the operator sets the production execution quantity in such a manner as to divide it two or more times, the CPU 11 may set automatically the production execution quantity in such a manner as to divide it two or more times. Also, in case the products B which were produced in the preceding day are to be produced in sequence, the production execution quantity may be set in one time. Furthermore, instead of performing (the calculation based on the already procured quantity, the calculation may be performed based on the already stocked quantity. Also, the desired production quantity can be decided in the unit of a suitable period such as month, day, time, etc. The unit for material A for storage is not necessarily uniform for each material A. By memorizing the quantity or number of material A loaded on each pallet in the classified material file 2, a required pallet quantity can be carried out even when any quantity of material A are loaded on the respective pallets. Also, the material A may be handled by fork lift or the like without using the automatic warehouse 110. Also the supply of the material A and the inlet of the products B may be performed without man power by interconnecting the inlet/outlet conveyor 123, the production area 151 and the palletizing area 152 using an automatic transferring vehicle or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A production execution method comprising the steps of:

storing in a storage facility at least one kind of material among various kinds of material used to produce goods, each of the various kinds of material being stored in respective unit loads of plural cases;

calculating a producible quantity of the goods based on an already procured quantity or already stocked quantity of the various kinds of material using calculation means;

selecting a desired quantity equal to or less than the producible quantity as a production execution quantity of the goods;

setting the production execution quantity by dividing it into two or more smaller quantities; and taking out a required quantity of the various kinds of material by removing from the storage facility the least amount of unit loads required to begin production of one of the divided smaller quantities of the production execution quantity of the goods in sequence, the least amount being determined by the calculation means.

2. A production execution method for producing a product from various goods comprising the steps of:

storing the various goods in a storage facility in respective unit loads of plural cases;

calculating in calculation means a producible quantity of the product in accordance with a presently procured quantity or presently stocked quantity of the various goods;

selecting a desired quantity of the product to be produced which is less than or equal to the producible quantity of the product;

setting a production quantity of the product by dividing the desired quantity of the product into first and second smaller quantities;

the calculation means, subsequent to said step of setting, determining the required number of cases of the various goods needed to produce the first and second smaller quantities of the product;

removing the various goods from the storage facility by respective unit loads such that the least amount of unit loads of the various goods needed to produce the first smaller quantity of the product are removed; and producing the first smaller quantity of the product using the removed various goods.

3. The production execution method of claim 2, further comprising the steps of:

removing the various goods from the storage facility by respective unit loads during said first smaller quantity producing step such that the least amount of unit loads of the various goods needed to produce the second smaller quantity of the product are removed; and producing the second smaller quantity of the product using the removed various goods.

4. The production execution method of claim 2, wherein said setting step comprises selecting the first smaller quantity to be smaller than the second smaller quantity.

5. The production execution method of claim 2, wherein said setting step comprises selecting the first smaller quantity such that the number of respective unit loads for each of the various goods removed during said removing steps in one unit load.

6. The production execution method of claim 2, wherein during said calculation step, the calculation means displays the presently procured quantity or presently stocked quantity of the various goods, wherein a particular one of the various goods which is common to all different types of products is indicated and a particular one of the various goods which is of shortest supply is also indicated.

7. The production execution method of claim 6, wherein the common good is indicated by an asterisk when displayed and the good of shortest supply is indicated by red highlighting when displayed.

* * * * *